(12) United States Patent
Peng et al.

(10) Patent No.: US 11,598,097 B2
(45) Date of Patent: Mar. 7, 2023

(54) COLORED SOLAR-REFLECTIVE ROOFING GRANULES, ROOFING PRODUCTS INCLUDING THEM, AND METHODS FOR MAKING THEM

(71) Applicant: CertainTeed Corporation, Malvern, PA (US)

(72) Inventors: Xiaofeng Peng, Shanghai (CN); Todd P. DiNoia, Littleton, MA (US); Oh-Hun Kwon, Westborough, MA (US); Aziz Mahfoud Familia, Summerfield, NC (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 16/365,399

(22) Filed: Mar. 26, 2019

(65) Prior Publication Data

US 2019/0305718 A1    Oct. 3, 2019

Related U.S. Application Data

(60) Provisional application No. 62/651,108, filed on Mar. 31, 2018.

(51) Int. Cl.
*E04D 7/00* (2006.01)
*H02S 20/25* (2014.01)
(Continued)

(52) U.S. Cl.
CPC .................... *E04D 7/005* (2013.01)

(58) Field of Classification Search
CPC ........ H02S 20/25; F24S 23/82; H01L 31/0547; Y10T 428/24355; Y10T 428/24372; E04D 1/26; E04D 7/00
See application file for complete search history.

(56) References Cited

U.S. PATENT DOCUMENTS

| 4,717,614 A | 1/1988 | Bondoc |
| 7,241,500 B2 | 7/2007 | Shiao |

(Continued)

OTHER PUBLICATIONS

M.H. ALy et al., "Synthesis of coloured ceramic pigments by using chromite and manganese ores mixtures," Ceramica, 56, 156-61 (2010).

(Continued)

*Primary Examiner* — Nathan L Van Sell
(74) *Attorney, Agent, or Firm* — McDonnell Boehnen Hulbert & Berghoff LLP

(57) ABSTRACT

The present disclosure relates to roofing granules, such as colored solar-reflective roofing granules, and to methods for making and their use in roofing products. One aspect of the disclosure provides a collection of colored solar-reflective roofing granules, wherein substantially each roofing granule includes an inner layer of a porous ceramic material, the pore size and material of the inner layer being selected such that the inner layer is substantially reflective of infrared radiation; and disposed about and substantially surrounding the inner layer, an outer layer of a substantially colored ceramic material, the outer layer of substantially colored ceramic material being substantially transmissive to infrared radiation, the collection of colored solar-reflective roofing granules having a L* of no more than 60 and a solar reflectivity of at least 30%.

29 Claims, 4 Drawing Sheets

(51) Int. Cl.
    *F24S 23/70*     (2018.01)
    *H01L 31/054*    (2014.01)

(56) References Cited

U.S. PATENT DOCUMENTS

| | | | |
|---|---|---|---|
| 8,790,778 B2 * | 7/2014 | Shiao | E04D 5/12 |
| | | | 428/403 |
| 9,442,219 B2 * | 9/2016 | Shiao | G02B 1/00 |
| 2008/0095984 A1 | 4/2008 | Desouto | |
| 2010/0141199 A1 | 6/2010 | Shiao | |
| 2010/0151199 A1 * | 6/2010 | Shiao | E04D 5/12 |
| | | | 428/144 |
| 2010/0167056 A1 | 7/2010 | Fuss | |
| 2010/0203336 A1 | 8/2010 | Shiao | |
| 2011/0008622 A1 | 1/2011 | Kalkanoglu | |
| 2011/0086201 A1 | 4/2011 | Shiao | |
| 2011/0223385 A1 | 9/2011 | Shiao | |
| 2014/0329008 A1 * | 11/2014 | Shiao | E04D 5/12 |
| | | | 427/160 |
| 2015/0266774 A1 * | 9/2015 | Budd | C03C 12/00 |
| | | | 428/402 |
| 2016/0304393 A1 * | 10/2016 | Jing | B82Y 30/00 |

OTHER PUBLICATIONS

Heubach, Heucodur IR brochure, Jun. 2014.

* cited by examiner

COLORED SOLAR-REFLECTIVE ROOFING GRANULES, ROOFING PRODUCTS INCLUDING THEM, AND METHODS FOR MAKING THEM

This application claims the benefit of priority of U.S. Provisional Patent Application No. 62/651,108, filed Mar. 31, 2018, which is hereby incorporated herein by reference in its entirety.

BACKGROUND OF THE DISCLOSURE

1. Field of the Disclosure

The present disclosure relates generally to roofing products. The present disclosure relates more particularly to roofing granules, such as colored solar-reflective roofing granules, and to methods for making and their use in roofing products.

2. Technical Background

Sized mineral rocks are commonly used as granules in roofing applications to provide protective functions to the asphalt shingles. Roofing granules are generally used in asphalt shingles or in roofing membranes to protect asphalt from harmful ultraviolet radiation. Roofing granules typically comprise crushed and screened mineral materials, which can be coated subsequently with a binder containing one or more coloring pigments, such as suitable metal oxides. The granules are employed to provide a protective layer on asphaltic roofing materials such as shingles, and to add aesthetic values to a roof.

Depending on location and climate, shingled roofs can experience very challenging environmental conditions, which tend to reduce the effective service life of such roofs. One significant environmental stress is the elevated temperature to which roofing shingles are subjected under sunny, summer conditions.

Mineral-surfaced asphalt shingles, such as those described in ASTM D0225 or D03462, are generally used in steep-sloped roofs to enhance the water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectivity, and hence will absorb solar heat, especially through the near infrared range (700 nm-2500 nm) of the solar spectrum. This phenomenon is increased as the granules covering the surface become dark in color. For example, while white-colored asphalt shingles can have solar reflectivity in the range of 25-35%, dark-colored asphalt shingles can have solar reflectivity of only 5-15%. Furthermore, except in the white or very light colors, there is typically only a very small amount of pigment in the color coating of the conventional granules that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called "urban heat-island effect" and increase the cooling load to its surroundings. This not only increases the demand for indoor cooling energy, but also contributes to smog formation due to higher surface temperatures. Hence, it is beneficial to have a surface with increased solar reflectivity, such as greater than 70 percent, to reduce solar heat gain, thereby reducing the heat flux entering the building envelope or reducing surface temperatures for lowering smog formation. It is therefore advantageous to have roofing shingles that have high solar reflectivity.

The surface reflectivity of an asphalt shingle or roofing membrane largely depends on the solar reflectivity of the granules that are used to cover the bitumen. Typically, roofing granules are applied such that about 95 to 97 percent of the shingle surface is effectively covered by the granules.

The state of California has implemented a building code requiring the low-sloped roofs to have roof coverings with high solar reflectivity. However, colored roofing granules, prepared using current coloring technology, are often not capable of achieving the desirable high levels of solar reflectivity. Thus, in order to reduce solar heat absorption, it has been suggested to apply coatings externally directly onto the shingled surface of roofs. White pigment-containing latex coatings have been proposed and evaluated by various manufacturers. However, the polymeric coating applied has only limited amount of service life and requires re-coat after certain years of service. Also, the cost of adding such a coating on roof coverings can be relatively high. Other manufactures have also proposed the use of exterior-grade coatings that were colored by IR-reflective pigments for deep-tone colors and sprayed onto the roof in the field.

Solar control films that contain either a thin layer of metal/metal oxides, or dielectric layers applied through vacuum deposition, have been commercially available for use in architectural glasses.

Many materials have been proposed for use in protecting roofing from solar heat radiation, such as ceramic grog, recycled porcelain, and white plastic chips. However, the previously proposed materials have limited use, and cannot satisfy all requirements for roofing materials, There is a continuing need for roofing materials, and especially asphalt shingles, that have improved resistance to thermal stresses. In particular, there is a need for roofing granules that provide increased solar heat reflectivity to reduce the solar absorption of the shingle.

This is especially true when granules are colored. White granules can provide high solar reflectivity, but are disadvantaged in the residential market because homeowners strongly prefer darker-colored roofing materials. In typical materials a colored appearance is associated with solar absorption, so colored materials typically do not provide high degrees of solar reflectivity. Hence, it would be advantageous to have new choices for colored roofing granules that have high solar reflectivities.

SUMMARY OF THE DISCLOSURE

In one aspect, the present disclosure provides a collection of colored solar-reflective roofing granules, wherein substantially each roofing granule comprises an inner layer of a porous ceramic material, the pore size and material of the inner layer being selected such that the inner layer is substantially reflective of infrared radiation; and disposed about and substantially surrounding the inner layer, an outer layer of a substantially colored ceramic material, the outer layer of substantially colored ceramic material being substantially transmissive to infrared radiation, the collection of colored solar-reflective roofing granules having a L* of no more than 60 and a solar reflectivity of at least 30%.

In another aspect, the present disclosure provides a roofing product comprising a substrate;

a bituminous material coated on the substrate, the bituminous material having a top surface; and the collection of solar-reflective roofing granules according to any of claims 1-36 disposed on the top surface of the bituminous material, thereby substantially coating the bituminous material in a region thereof.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

The patent or application file contains at least one drawing executed in color. Copies of this patent or patent application publication with color drawings will be provided by the Office upon request and payment of the necessary fee.

DETAILED DESCRIPTION

The present inventors have noted that, while solar-reflective coatings and materials used in roofing granules can provide a relatively good solar reflectivity to a roofing product bearing them, additional improvements are necessary. The present inventors have noted that, while use of highly white materials at the surface of a roofing granule can improve its overall reflectivity, such white roofing granules are undesirable in the residential marketplace because homeowners strongly prefer the look of a darker-colored roofing material.

The present inventors have determined that colored but highly solar reflective roofing granules can be performed by using an inner layer of a porous ceramic material having a high solar reflectivity, and an outer layer of a colored ceramic material. The outer layer can provide the color to the granule, while the porous ceramic material of the inner layer can provide high reflectivity.

Accordingly, one aspect of the disclosure is a collection of colored solar-reflective roofing granules. Substantially each roofing granule comprises an inner layer of a porous ceramic material, the pore size and material of the inner layer being selected such that the inner layer is substantially reflective of infrared radiation; and disposed about the inner layer, an outer layer of a substantially colored ceramic material. The collection of colored solar-reflective roofing granules has an L* of no more than 60 and a solar reflectivity of at least 30%.

As used herein, "in substantially each roofing granule" or "the solar-reflective roofing granules of the collection substantially comprise" means that there may be a very minor number of granules (e.g., less than 2% or even less than 1%) of the collection that do not meet the parameter referred to, as long as that number of granules does not substantially affect the overall performance of the collection of roofing granules. All properties described herein are understood to apply to "substantially each roofing granule," unless otherwise made clear by the text.

Figure 1:
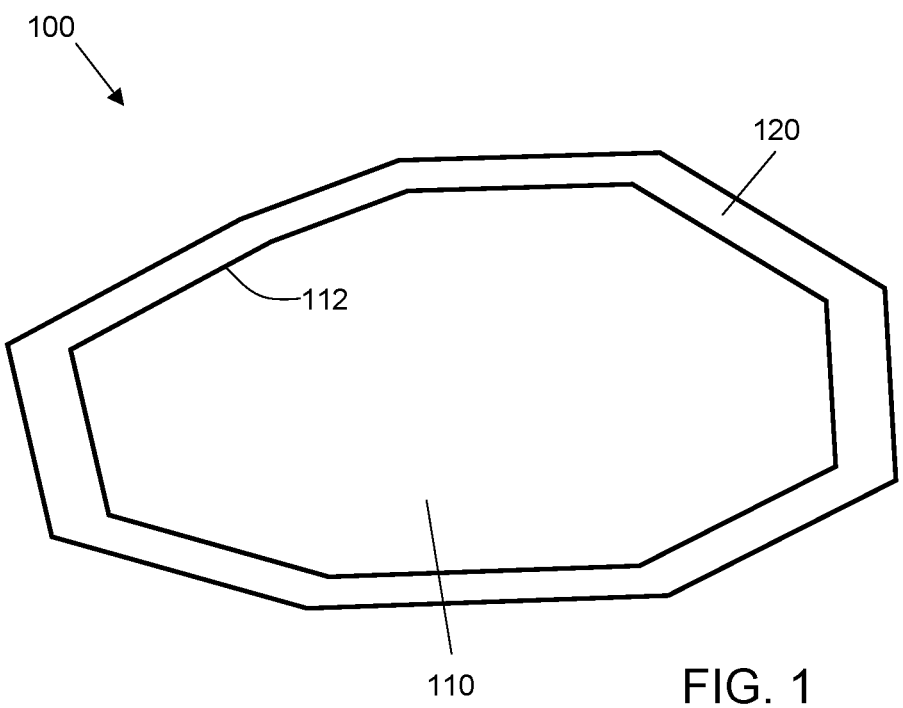
FIG. 1 is a schematic view of a roofing granule according to one embodiment of the disclosure.

A schematic view of such a roofing granule is shown in FIG. 1. Roofing granule 100 has an inner layer 110 having an outer surface 112. The inner layer is of a porous ceramic, in which the pore size and material are selected such that the inner layer is substantially reflective of infrared radiation. Disposed about and substantially surrounding the inner layer is an outer layer 120 of a substantially colored ceramic material. A collection of such roofing granules has a L* of no more than 60, meaning that the granules have a substantially dark appearance. The collection of roofing granules also has a solar reflectivity of at least 30%.

In certain embodiments as otherwise described herein, in substantially each roofing granule of the collection, the outer layer is disposed on an outer surface of the inner layer. This is shown in the granule 100 of FIG. 1; outer layer 120 is disposed on the outer surface 112 of the inner layer 110. There can in other embodiments be cases in which there is some intermediate layer or layers between the outer layer and the inner layer. However, such an intermediate layers are desirably relatively thin (e.g., no more than 5 microns in thickness, e.g., no more than 1 micron in total thickness).

The inner layers and outer layers described herein can be configured into roofing granules in many ways, as the person of ordinary skill in the art would appreciate. For example, in certain embodiments, in substantially each roofing granule of the collection the inner layer is formed as a granule core. This is the configuration shown in FIG. 1, with inner layer 110 formed as a granule core and outer layer 120 substantially surrounding that core.

But in other embodiments, in substantially each roofing granule of the collection the inner layer is formed as a layer surrounding a base particle. An example of such a roofing granule is shown in schematic cross-sectional view in FIG. 2. Here, inner layer 210 is formed as a layer surrounding base particle 230, with outer layer 220 formed on inner layer 210. A wide variety of materials can be used as the base particles of the granules, for example, crushed slate, slate granules, shale granules, mica granules or metal flakes. In other embodiments, the base particles are synthetic particles, e.g., formed of a ceramic material using conventional methods. The inner layer can be made of a thickness sufficient for solar radiation not to substantially reach the base particle, so the optical properties of the base particle are not of high importance. As such, the base particle can provide bulk to the granule and be made of less expensive materials, while having little effect on actual optical performance of the granule.

The porosity of the inner layer can be selected by the person of ordinary skill in the art based on the present disclosure to provide the roofing granules with a desirably high reflectivity to infrared radiation. As used herein, "infrared radiation" is the portion of the solar spectrum that is within the range of 700-2500 nm in wavelength, weighted as in solar radiation. Reflectivity to solar radiation can be performed by reflectometry using a solar reflectometer, without considering radiation below 700 nm in wavelength (e.g., by physically filtering the radiation below 700 nm in wavelength or by discounting signal from radiation below 700 nm in wavelength. As used herein, "substantially reflective to infrared radiation" means at least 70% reflectivity of infrared radiation.

In certain embodiments as otherwise described herein, in substantially each roofing granule the porosity of the inner layer is at least 10%. For example, in certain embodiments, in substantially each roofing granule the porosity of the inner layer is at least 20%, at least 25%, or even at least 30%. In certain embodiments, the porosity is in the range of 10-50%, 20-50%, 25-50% or even 30-50%. Porosity is measured by mercury intrusion porosimetry (i.e., of the material of the inner layer). The person of ordinary skill in the art will appreciate based on the present disclosure that the porosity necessary to give a desired reflectivity to the inner layer will depend on the material from which the inner layer is formed.

The thickness of the inner layer can be selected based on the present disclosure to provide sufficient optical path length to provide the desired degree of scattering and thus the desired degree of infrared reflectivity to the overall granule. For example, in certain embodiments (e.g., when the inner layer is formed as a layer on a base particle), in substantially each roofing granule of the collection the thickness of the inner layer is at least 25 microns, at least 50 microns, or even at least 100 microns. In certain such embodiments, in substantially each roofing granule the thickness of the inner layer is no more than 500 microns, e.g., no more than 250 microns, or even no more than 100 microns.

And in certain embodiments (e.g., when the inner layer is formed as the granule core), in substantially each roofing granule the thickness of the inner layer is at least 250 microns, e.g., at least 250 microns, at least 300 microns, at least 500 microns, at least 700 microns, or at least 1 mm. In certain such embodiments, in substantially each roofing granule the thickness of the inner layer is no more than 10 mm, e.g., no more than 5 mm, or even no more than 2 mm.

Figure 2:
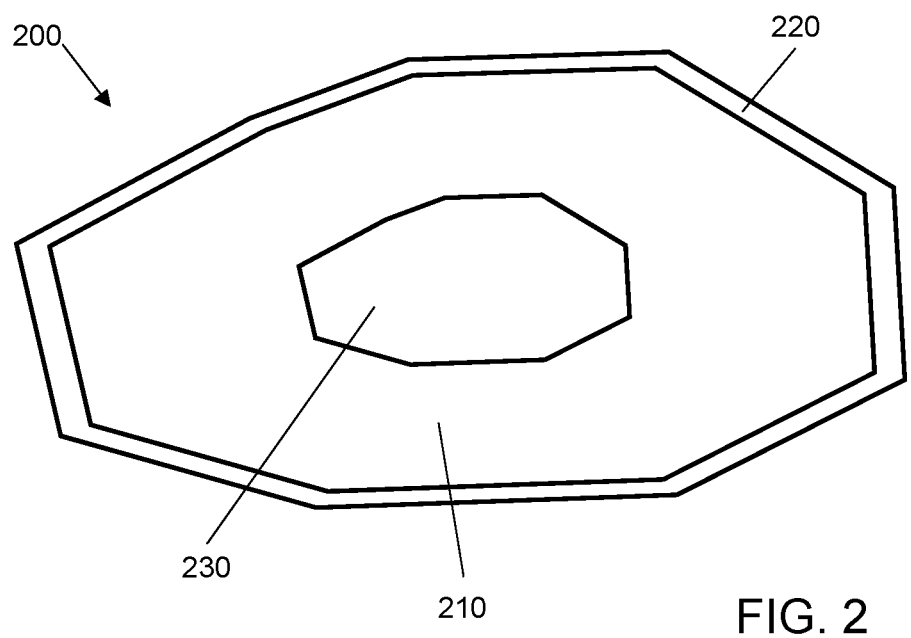
FIG. 2 is a schematic view of a roofing granule according to another embodiment of the disclosure.

For the outer layer and for an inner layer formed as a coating on a base particle (i.e., as shown in FIG. 2), thicknesses are measured as an average thickness over the surface of the granule. Thickness of an inner layer formed as a granule core (i.e., as in FIG. 1) is measured as the arithmetical mean of the longest dimension of the inner layer (defining a first axis), the longest dimension of the inner layer in a direction perpendicular to the first axis (defining a second axis) and the longest dimension of the inner layer along a third axis perpendicular to the first and second axes.

The inner layer can be formed from a variety of ceramic materials. While pure materials such as pure aluminum oxide may in some cases be preferred from the standpoint of absorptivity, such materials are considerably expensive. The present inventors have noted that an increase in porosity can be used to account for an increase of absorption in a material. For example, while 12% porosity provides pure $Al_2O_3$ with a solar reflectivity of about 100%, the solar reflectivity of bauxite is much less at 12% porosity. When formed at 29% porosity, bauxite has solar reflectivity of about 80%.

The inner layer can be formed from a variety of materials. In certain embodiments, the material of the inner layer is an aluminate, silicate or aluminosilicate-based ceramic material. Such materials can be formed, e.g., from a variety of feeds, such as alumina, aluminum trihydrate, bauxite or kaolin. But a wide variety of other ceramic materials can be used to form porous inner layers as described herein. Other conventional components, e.g., biocides and alkali silicates can also be included.

The material of the inner layer desirably has a low absorptivity to solar radiation. Accordingly, the material of the inner layer desirably has relatively low amounts of Ti and Fe, e.g., less than 3 wt % Fe (as $Fe_2O_3$) and less than 5 wt % Ti (as $TiO_2$), both on an oxide basis, as these materials can cause undesirable absorption loss (and thus heating) in the granule. Moreover, in cases where iron and titanium are present, the person of ordinary skill in the art can control the processing of the material to avoid the formation of absorptive phases (e.g., iron/titanium brown spinels, which can form at temperatures of 1300° C. and higher).

The inner layer can be formed using conventional techniques for making porous ceramic materials, e.g., by selection of sintering conditions and/or through the use of pore formers such as particulate carbon. The methods described in U.S. Patent Application Publications nos. 2010/0167056 and 2010/0151199, each of which is hereby incorporated herein by reference in its entirety, can also be adapted to provide porous inner layers from appropriate materials. The desired shape of the inner layer can be formed, e.g., by extrusion or granulation in the cases of an inner layer formed as granule cores; or by coating methodologies when the inner layer is formed as a layer on a base particle. Conventional sintering and/or calcining processes can be used to convert green particles and layers to the ceramic material of the inner layer.

The person of ordinary skill in the art can select materials and porosities necessary to provide a desired reflectivity to the inner layer of a granule. For example in certain embodiments, the inner layer has a reflectivity of at least 75% to infrared radiation, e.g., at least 80% or even at least 85%.

As described above, the outer layer is of a substantially colored ceramic material. In certain embodiments, the outer layer of substantially colored ceramic material is substantially transmissive to infrared radiation; as used here, "substantially transmissive to infrared radiation" means that a layer has an infrared transmissivity of at least 70%. In certain such embodiments, the outer layer has an infrared transmissivity of at least 75%, or even at least 80%. However, in other embodiments, e.g., when significant amounts of infrared-reflective pigment or dopant are provided in the outer layer, the outer layer is not substantially transmissive to infrared radiation.

The porosity of the outer layer can be selected by the person of ordinary skill in the art based on the present disclosure to provide the outer layer with desired properties, e.g., strength, toughness, resistance to staining, and in some embodiments a desirably high infrared transmissivity. For example, in certain embodiments, in substantially each roofing granule the porosity of the outer layer is less than 5%, e.g., less than 2% or even less than 1%.

The thickness of the outer layer can be selected based on the present disclosure to provide the color to the overall granule. In certain embodiments, in substantially each roofing granule the thickness of the outer layer is at least 100 nm, at least 150 nm, at least 250 nm, or at least 500 nm. If the outer layer is too thick, however, it can undesirably absorb significant radiation in the infrared range. Accordingly, in certain embodiments, the outer layer has a thickness of no more than 5 microns, e.g., no more than 2 microns, no more than 1 micron or no more than 500 nm. The person of ordinary skill in the art will select a desirable thickness in view of the particular materials of the outer layer, especially the particular pigments used in the outer layer, based on the disclosure herein.

The person of ordinary skill in the art will appreciate that the outer layer is desirably made from a substantially different material than the inner layer. Accordingly, in certain desirable embodiments, in substantially each roofing granule the outer layer is a discrete layer from the inner layer, having a discrete boundary therebetween. That is, the properties of the material of the granule change substantially discontinuously between the value of the inner layer and the value of the outer layer, e.g., over a length scale of 1 micron or less.

The outer layer can be made, for example, from a ceramic material that includes a colored pigment and/or dopant. As used herein, "colored" means having substantial absorbance within the wavelength range of 400-700 nm, so as to provide color to the outer layer and thus to the overall roofing granule. As the person of ordinary skill in the art will appreciate, a wide variety of pigments and dopants can be used in the outer layers of the granules described herein.

For example, in certain embodiments, the pigment or dopant is a so-called "complex inorganic color pigment." As the person of ordinary skill in the art will appreciate, a complex inorganic color pigment is a type of inorganic pigment composed of more than two kinds of metal oxides. They are often produced by calcination, and as such can be provided as a feedstock to the material used to make the outer layer, or can be formed during a calcining process in making the ceramic material. Most infrared-reflective pigments are complex inorganic color pigments. The complex inorganic color pigments are chiefly rutile (exemplified by $(Ni,Sb,Ti)O_2$, which is yellow) or spinel (exemplified by $(Co,Zn)Al_2O_4$, which is blue) in crystal structure, although there are many other possible crystal structures, e.g., zircon (e.g., $(V,Zr)SiO_4$, turquoise), hematite (e.g., $(Fe,Cr)_2O_3$, black/brown) and cassiterite (e.g., $(Co,Zn)SiO_3$, blue). Nickel manganese ferrite blacks (Pigment Black 30) and iron chromite brown-blacks (CI Pigment Green 17, CI Pigment Browns 29 and 35) are some of the infrared reflective pigments that can be used to provide dark colors with reduced heat buildup. Other commercially available infrared reflective pigments are Pigment Blue 28 Pigment Blue 36, Pigment Green 26, Pigment Green 50, Pigment Brown 33, Pigment Brown 24, Pigment Black 12 and Pigment Yellow 53. A variety of other infrared-reflective pigments are available. Examples of near IR-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium). In many cases, the infrared-reflective pigments absorb visible light but reflect or transmit infrared light. In certain desirable embodiments, the pigment is flake-like, and has an average aspect ratio in excess of 5 (i.e., a thickness that is no more than ⅕ of the length and no more than ⅕ of the width).

Of course, other pigments can be used instead of or in addition to the complex inorganic color pigments. Examples of mirrorized silica pigments that can be used in the compositions for use herein include pigments such as Chrom Brite™ CB4500, available from Bead Brite, 400 Oser Ave, Suite 600, Hauppauge; N.Y. 11788. Examples of metal pigments that can be employed in the compositions for use herein include aluminum flake pigment, copper flake pigments, copper alloy flake pigments, and the like. Metal pigments are available, for example, from ECKART America Corporation, Painesville, Ohio 44077. Suitable aluminum flake pigments include water-dispersible lamellar aluminum powders such as Eckart RO-100, RO-200, RO-300, RO-400, RO-500 and RO-600; non-leafing silica coated aluminum flake powders such as Eckart STANDART PCR 212, PCR 214, PCR 501, PCR 801, and PCR 901, and STANDART Resist 211, STANDART Resist 212, STANDART Resist 214, STANDART Resist 501 and STANDART Resist 80; silica-coated oxidation-resistant gold bronze pigments based on copper or copper-zinc alloys such as Eckart DOROLAN 08/0 Pale Gold, DOROLAN 08/0 Rich Gold and DOROLAN 10/0 Copper. Examples of titanates that can be employed in the compositions for use herein include titanate pigments such as colored rutile, priderite, and pseudobrookite structured pigments, including titanate pigments comprising a solid solution of a dopant phase in a rutile lattice such as nickel titanium yellow, chromium titanium buff, and manganese titanium brown pigments, priderite pigments such as barium nickel titanium pigment; and pseudobrookite pigments such as iron titanium brown, and iron aluminum brown. The preparation and properties of titanate pigments are discussed in Hugh M. Smith, High Performance Pigments, Wiley-VCH, pp. 53-74 (2002).

A variety of dopants can similarly be used to provide color to the outer layer. The dopants can themselves provide color (i.e., in the state in which they are provided to the composition used to form the ceramic material of the outer layer), or instead they can react during processing (e.g., during calcining) to provide a species that provides color to the outer layer. For example, in certain embodiments, the composition used to form the ceramic material includes iron(III) and/or chromium(III) as dopants (e.g., provided as oxides or nitrates). Chromium (Ill) itself can provide some color to a material; accordingly, in some embodiments, the outer layer is chromium(III)-doped material (e.g., chromium(III)-doped alumina); e.g., in the range of 1-4 wt % or 2-3 wt % Cr(III) (on an oxide basis). Moreover, chromium(III) and iron(III) can react, e.g., during a calcining operation, to form iron chromite ($FeCr_2O_4$), which can act to provide color and reflect infrared radiation. Iron chromite can be formed, e.g., by reaction of chromium with iron that is present in the material as an impurity, by addition of black chromium oxide pigment, or by addition of both chromium and iron (e.g., as nitrates). Various transition metals (e.g., Ti, V, Cr; Mn, Fe, Co, Ni, Cu, Zn and Zr and mixtures of thereof) can be used to form colored ceramic materials, e.g., by forming color centers and various oxide compounds such as spinel, perovskite, garnet, olivine, pyroclore, zircon, etc.

A wide variety of base ceramic materials can be used together with the pigments and/or dopants described above (e.g., with the pigment and/or dopant dispersed therein). As the outer layer can be relatively thin, a purer (and therefore generally more expensive) base ceramic material can be used. In certain embodiments, the base ceramic material is alumina. In certain embodiments, the base ceramic material of the outer layer is an aluminate, silicate or aluminosilicate-based ceramic material. Such materials can be formed, e.g., from a variety of feeds, such as alumina, aluminum trihydrate, bauxite or kaolin. Other conventional components, e.g., biocides and alkali silicates can also be included. But a wide variety of other ceramic materials (including glassy and class-ceramic materials) can be used to form outer layers as described herein.

The outer layer can be formed using conventional techniques in the art. For example, the outer layer can be formed on the inner layer by various coating techniques, e.g., fluidized bed spray coating or pan coating of a slurry or suspension of a ceramic precursor or material together with the desired pigment and/or dopant followed by a firing operation to form the outer layer. The outer layer can be formed on the inner layer after it is completely formed (e.g., after the inner layer is fired), or in other embodiments can be formed on the green material of the inner layer, with the inner layer and the outer layer being converted to their respective ceramic materials in the same firing operation.

Figure 3:
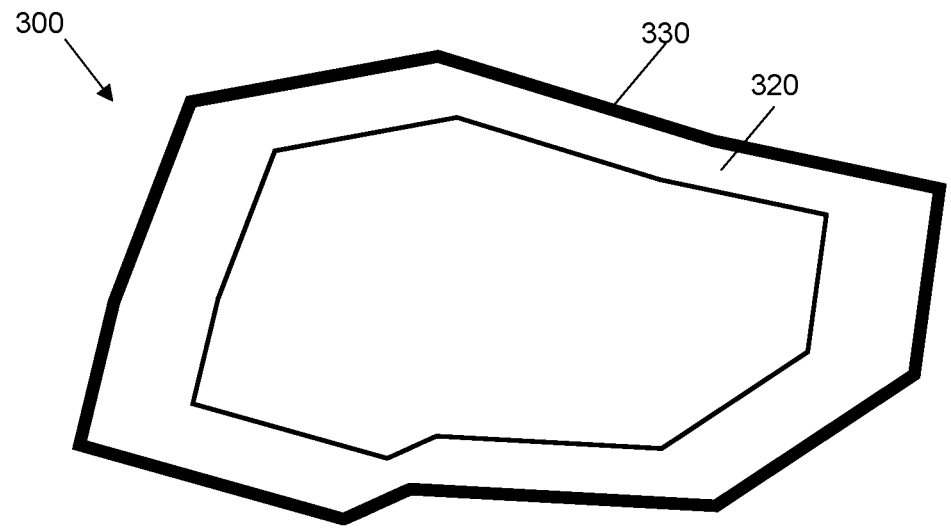
FIG. 3 is a schematic view of a roofing granule according to another embodiment of the disclosure.

In certain embodiments, the outer layer forms the outermost layer of the roofing granule, e.g., as shown in FIGS. 1 and 2. However, in other embodiments, thin transparent coatings can be formed on the outer layer of the granule, as long as such a coating is substantially transmissive. For example, such a coating can be derived from a material selected from silanes, siloxanes, polysiloxanes, organo-siloxanes, silicates, organic silicates, silicone resins, acrylics, urethanes, polyurethanes, glycol ethers and mixtures thereof. Examples of coatings and methods for coating are described in U.S. Pat. App. Publication no. 20110081537, U.S. Pat. Nos. 7,241,500, 3,479,201, 3,255,031, and 3,208,571, all of which are incorporated herein by reference in their entirety for all purposes. In certain desirable embodiments, the coating has a transmittance to visible radiation of at least 80%, at least 90%, or even at least 95%. Such an embodiment is shown in schematic cross-sectional view in FIG. 3. In the roofing granule 300, coating 330 is formed on the outer surface of outer layer 320.

The roofing granules are desirably substantially non-transmissive to ultraviolet radiation (i.e., in the 300-400 nm range), so that they protect the bituminous material of the shingle on which they are disposed. Materials such as $CeO_2$, $TiO_2$ and ZnO can be used, e.g., in the inner layer, the outer layer, or both, to absorb UV radiation.

The person of ordinary skill in the art will appreciate that the colored solar-reflective roofing granules can be provided in a wide variety of sizes. For example, in certain embodiments as otherwise described herein, at least 90% of the solar-reflective roofing granules of the collection have a particle size in the range of #5 US mesh to #50 US mesh.

The roofing granules as described herein can advantageously have high solar reflectivity values in combination with a desirable dark color. As described above, the collections of roofing granules of the disclosure have a L* value of no more than 60 and a solar reflectivity of at least 30%. Solar reflectivity of granules is measured of the granules disposed on a flat surface (e.g., in a petri dish) packed to provide a flat surface (i.e., so that only granules are visible from above) using a solar reflectometer pursuant to ASTM C1549. L*, a* and b* values are of the CIE color space, and can be measured on the same sample as the solar reflectivity, using Labscan XE instrument, available from Hunter Laboratories.

In certain embodiments, the collection of roofing granules has a solar reflectivity of at least 33%, at least 36%, or even at least 39%. In certain embodiments, the collection of roofing granules has a L* value of no more than 50, no more than 40, or no more than 30. The person of ordinary skill in the art will appreciate that higher L* values can be correlated with higher solar reflectivities, and lower L* values can be correlated with higher solar reflectivities.

Desirably, the colored solar-reflective roofing granules are low in roughness, so that light does not get trapped and absorbed at the granule surface. In certain embodiments, at least 80% of the granules have a surface roughness Ra of no more than 300 nm.

Figure 4:
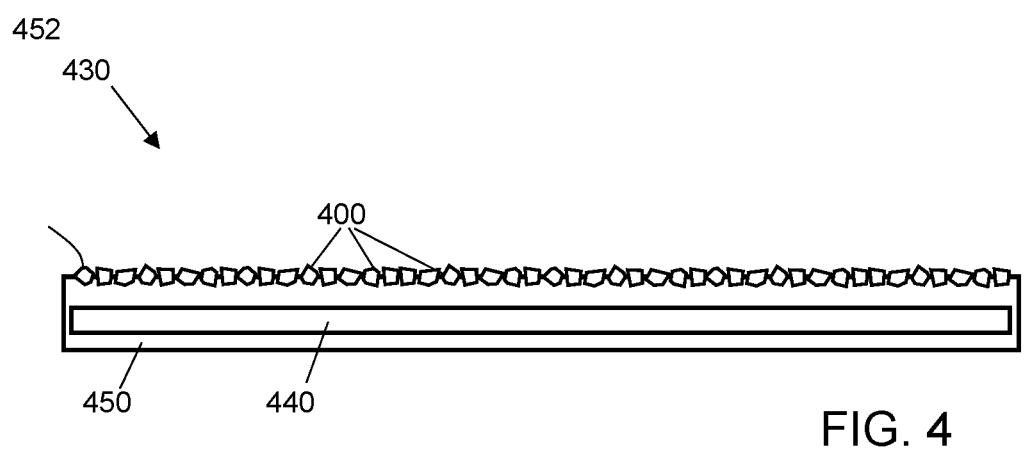
FIG. 4 is a schematic view of a roofing product according to another embodiment of the disclosure, FIG. 5 provides a graph and a set of transmission spectra (in which the top-to-bottom orders of traces at the down arrows are listed) demonstrating the effect of the porosity on the solar reflectivity of the pure $Al_2O_3$ coupons.

Another aspect of the disclosure is a roofing product comprising a substrate; a bituminous material coated on the substrate, the bituminous material having a top surface; and a collection of solar-reflective roofing granules as described herein disposed on the top surface of the bituminous material, thereby substantially coating the bituminous material in a region thereof. One embodiment of such a roofing product is shown in schematic cross-sectional view in FIG. 4. In the embodiment of FIG. 4, roofing product 430 includes substrate 440, having a bituminous material 450 disposed thereon. Bituminous material 450 has top surface 452. As the person of ordinary skill in the art will appreciate, the bituminous material can be coated on both surfaces of, or even saturate the roofing substrate. A variety of materials can be used as the substrate, for example, conventional bituminous shingle or membrane substrates such as roofing felt or fiberglass. A collection of solar-reflective roofing granules 400 is disposed on the top surface 452 of the bituminous material 450, such that they substantially coat the bituminous material in a region 455 thereof. The region can be, for example, the exposure zone of a shingle, or a region that is otherwise to be exposed when the roofing product is installed on a roof. The solar-reflective roofing granules are desirably embedded somewhat in the bituminous material to provide for a high degree of adhesion. As the person of ordinary skill in the art will appreciate, other granular or particulate material can coat the bituminous material in regions that will not be exposed, e.g., on a bottom surface of the roofing product, or in a headlap zone of a top surface of the roofing product, as is conventional.

Presented below is additional information regarding the materials described herein.

Figure 5:
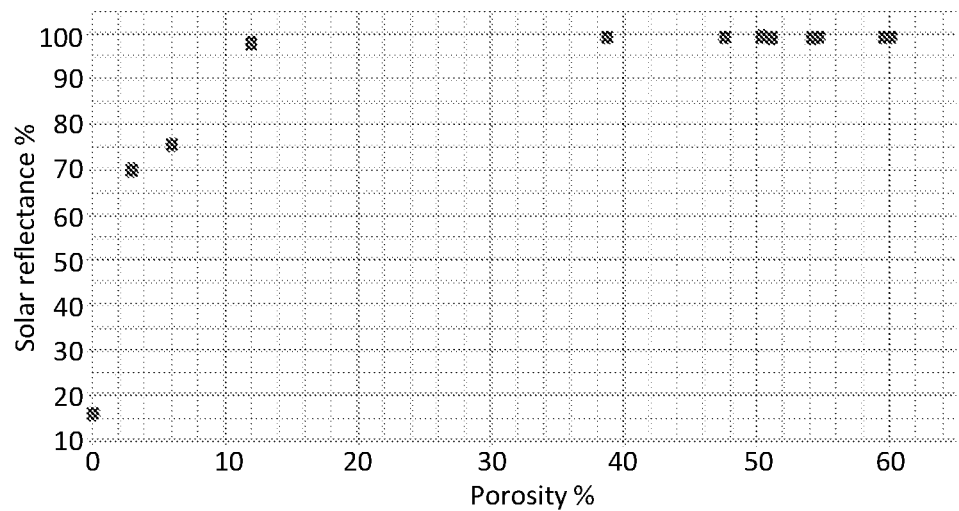
Figure 5:
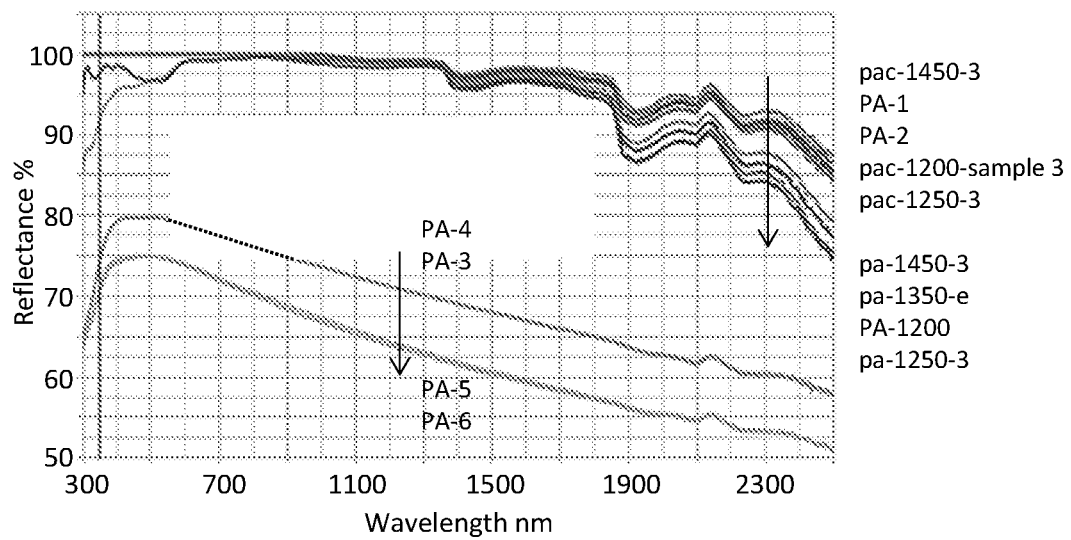

Pure $Al_2O_3$ was formed into coupons with a range of porosities. FIG. 5 provides a graph and a set of transmission spectra demonstrating the effect of the porosity on the solar reflectivity of the pure $Al_2O_3$ coupons. The porosity was induced using a variety of sintering temperatures and using carbon as a pore former. The 0.1% data point is from a transparent ceramic, not a sample made in this experimental study. For pure alumina, once the porosity is at least 10%, the solar reflectivity is about 100%, i.e., nearly saturated. Some fluorescence in the ultraviolet and absorption due to moisture in the infrared can be observed in most reflection spectra. Normally, pure alumina is expected to be transparent in the UV range; the inventors surmise that the UV performance observed is a result of porosity.

Figure 6:
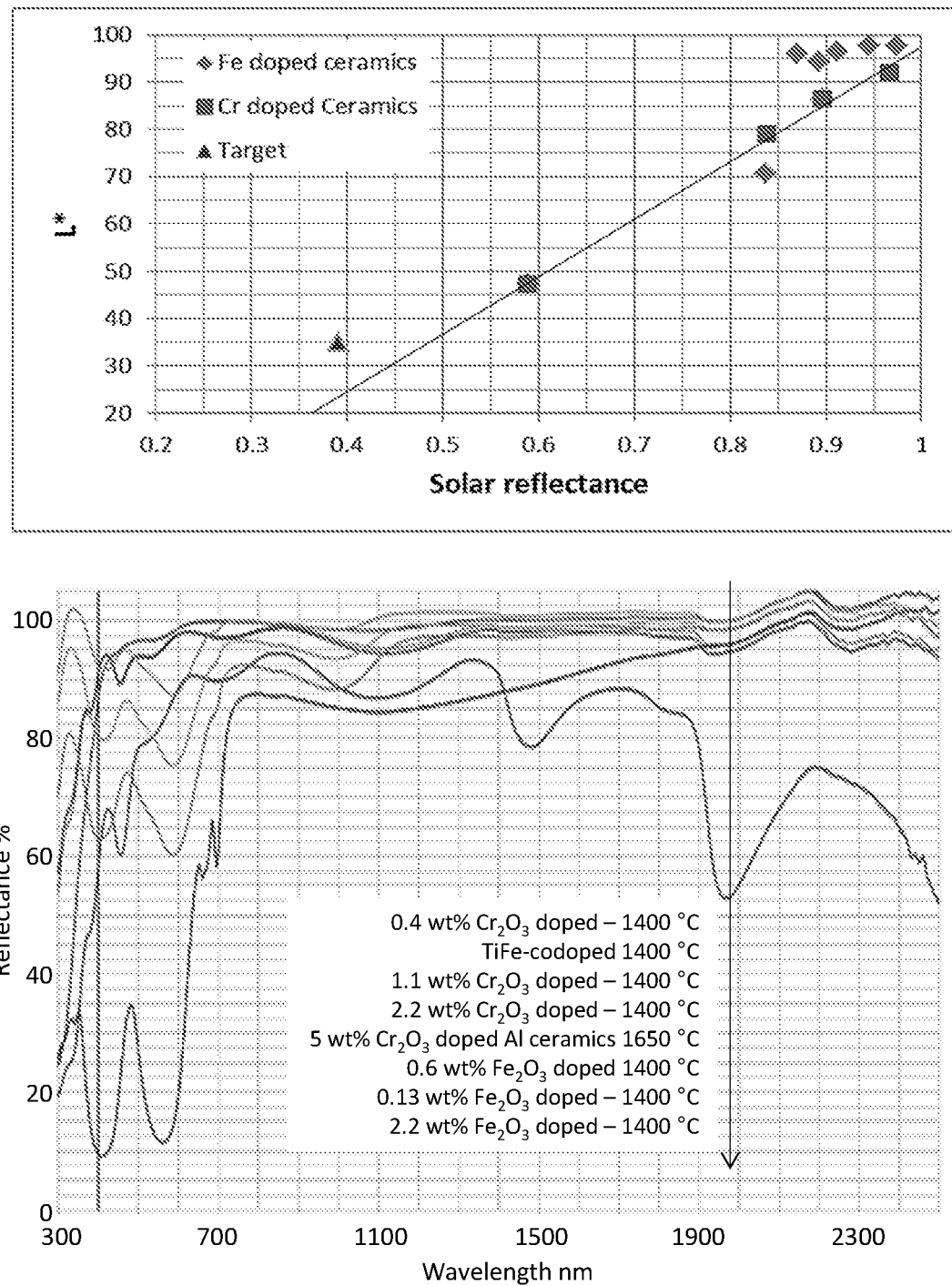
FIG. 6 is a pair of graphs showing the L*-SR curve and the reflection spectra (in which the top-to-bottom orders of traces at the down arrows are listed) of $Fe_2O_3$ or $Cr_2O_3$ doped alumina ceramic coupons.

Doped ceramics were investigated for their ability to provide a desired color in combination with high solar reflectivity. Here, $Fe^{3+}$ and $Cr^{3+}$ were investigated as dopants due to their excellent color performance and the fact that $FeCr_2O_4$ is a typical cool black pigment. FIG. 6 is a pair of graphs showing the L*-SR curve and the reflection spectra of $Fe_2O_3$ or $Cr_2O_3$ doped alumina ceramic coupons. The table below provides more details of the $Cr^{3+}$ doped alumina ceramic coupons.

| ID | L* | a* | b* | SR |
|---|---|---|---|---|
| ~0.45 wt % $Cr:Al_2O_3$ (0.2 g $Cr(NO_3)_3 \cdot 9H_2O$ in 10 g $Al_2O_3$ 1400° C.) | 92.06 | −1.2 | −2.57 | 0.9662 |
| ~1.1 wt % $Cr:Al_2O_3$ (0.5 g $Cr(NO_3)_3 \cdot 9H_2O$ in 10 g $Al_2O_3$ 1400° C.) | 86.29 | −2.05 | −3.77 | 0.8972 |
| ~0.9 wt % $Cr:Al_2O_3$ (IRA1-CR1, 1650° C., 3 hr) | 78.89 | 8.21 | −2.73 | 0.839 |
| ~5 wt % $Cr:Al_2O_3$ (IRA2-CR5, 1650° C., 3 hr) | 47.23 | 13.56 | −2.06 | 0.589 |

The $Cr^{3+}$ dopant level is not exactly accurate because of the undefined crystalized water in the chrome nitrate $Cr(NO_3)_3.9H_2O$. All ceramics were sintered at 1400° C. with the porosity from 15% to 28% due to the different dopant level, except for the two $Cr^{3+}$ doped alumina ceramics noted in the table as 1650° C. $Fe_3O_4$ is a typical "hot" black pigment like carbon. Thus the iron concentration was limited in a low level, <2.2 wt %. The data show that the $Fe^{3+}$ dopant can significantly decrease the solar reflectivity but provide a similar L* at ~95. Almost all $Fe^{3+}$ doped ceramics exhibit high reflection, like that described above for pure alumina ceramics. $Cr^{3+}$ doped alumina ceramics exhibit good performance. Both L* and SR decrease with increasing $Cr^{2+}$ concentration in the ceramics. 5 wt % $Cr^{3+}$ doped ceramics shows great spectrum, red curve in FIG. 6, having a total solar reflectivity of 58.9% with over 85% in the near infrared.

Additional aspects of the disclosure are provided by the enumerated embodiments below, which can be combined and permuted in any number and in any combination that is not technically or logically inconsistent.

Embodiment 1

A collection of colored solar-reflective roofing granules, wherein substantially each roofing granule comprises
an inner layer of a porous ceramic material, the pore size and material of the inner layer being selected such that the inner layer is substantially reflective of infrared radiation; and
disposed about and substantially surrounding the inner layer, an outer layer of a substantially colored ceramic material, the outer layer of substantially colored ceramic material being substantially transmissive to infrared radiation,
the collection of colored solar-reflective roofing granules having a L* of no more than 60 and a solar reflectivity of at least 30%.

Embodiment 2

The collection of colored solar-reflective roofing granules according to embodiment 1, wherein in substantially each roofing granule the outer layer is disposed on an outer surface of an inner layer.

Embodiment 3

The collection of colored solar-reflective roofing granules according to embodiment 1- or embodiment 2, wherein in substantially each roofing granule of the collection the inner layer is formed as a granule core.

Embodiment 4

The collection of colored solar-reflective roofing granules according to embodiment 1 or embodiment 2, wherein in substantially each roofing granule of the collection the inner layer is formed as a layer surrounding a base particle.

Embodiment 5

The collection of solar-reflective roofing granules according to embodiment 4, wherein the base particle is crushed slate, slate granules, shale granules, mica granules or metal flakes.

Embodiment 6

The collection of solar-reflective roofing granules according to embodiment 4, wherein the base particle is a synthetic particle.

Embodiment 7

The collection of colored solar-reflective roofing granules according to any of embodiments 1-6, wherein in substantially each roofing granule the porosity of the inner layer is at least 10%, e.g., in the range of 10-50%.

Embodiment 8

The collection of colored solar-reflective roofing granules according to any of embodiments 1-6, wherein in substantially each roofing granule the porosity of the inner layer is at least 20%, e.g., in the range of 20-50%.

Embodiment 9

The collection of colored solar-reflective roofing granules according to any of embodiments 1-6, wherein in substantially each roofing granule the porosity of the inner layer is at least 25%, e.g., in the range of 25-50%.

Embodiment 10

The collection of colored solar-reflective roofing granules according to any of embodiments 1-6, wherein in substantially each roofing granule the porosity of the inner layer is at least 30%, e.g., in the range of 30-50%.

Embodiment 11

The collection of colored solar-reflective roofing granules according to any of embodiments 1-10, wherein in substantially each roofing granule the inner layer has a thickness of at least 25 microns, e.g., at least 50 microns or even at least 100 microns.

Embodiment 12

The collection of colored solar-reflective roofing granules according to embodiment 11, wherein in substantially each roofing granule the thickness of the inner layer is no more than 500 microns, e.g., no more than 250 microns, or even no more than 100 microns.

Embodiment 13

The collection of colored solar-reflective roofing granules according to any of embodiments 1-10, wherein in substantially each roofing granule the inner layer has a thickness of at least 250 microns, e.g., at least 300 microns, at least 500 microns, at least 700 microns, or at least 1 mm.

Embodiment 14

The collection of colored solar-reflective roofing granules according to embodiment 13, wherein in substantially each roofing granule the thickness of the inner layer is no more than 10 mm, e.g., no more than 5 mm, or even no more than 2 mm.

Embodiment 15

The collection of colored solar-reflective roofing granules according to any of embodiments 1-14, wherein the material of the inner layer is an aluminate-, silicate- or aluminosilicate-based ceramic.

Embodiment 16

The collection of colored solar-reflective roofing granules according to embodiment 15, wherein the material of the inner layer is formed from as alumina, aluminum trihydrate, bauxite or kaolin.

Embodiment 17

The collection of colored solar-reflective roofing granules according to any of embodiments 1-16, wherein the inner layer has a reflectivity of at least 80% to infrared radiation.

Embodiment 18

The collection of colored solar-reflective roofing granules according to any of embodiments 1-17, wherein in substantially each roofing granule the porosity of the outer later layer is less than 5°/s.

Embodiment 19

The collection of colored solar-reflective roofing granules according to any of embodiments 1-17, wherein in substantially each roofing granule the porosity of the outer later layer is less than 2%.

Embodiment 20

The collection of colored solar-reflective roofing granules according to any of embodiments 1-19, wherein the outer layer has a thickness of at least 100 nm, e.g., at least at least 150 nm, at least 250 nm, or at least 500 nm.

Embodiment 21

The collection of colored solar-reflective roofing granules according to any of embodiments 1-20, wherein the outer layer has a thickness of no more than 5 microns, e.g., no more than 2 microns or no more than 1 micron.

Embodiment 22

The collection of colored solar-reflective roofing granules according to any of embodiments 1-21, wherein in substantially each roofing granule the outer layer is a discrete layer from the inner layer, having a discrete boundary therebetween.

Embodiment 23

The collection of colored solar-reflective roofing granules according to any of embodiments 1-22, wherein the outer layer comprises a pigment and/or dopant.

Embodiment 24

The collection of colored solar-reflective roofing granules according to any of embodiments 1-23, wherein the outer layer comprises a complex inorganic color pigment.

Embodiment 25

The collection of colored solar-reflective roofing granules according to embodiment 24, wherein the pigment is flake-like having an aspect ratio in excess of 5.

Embodiment 26

The collection of colored solar-reflective roofing granules according to any of embodiments 1-23, wherein the outer layer comprises a chromium(III) dopant.

Embodiment 27

The collection of colored solar-reflective roofing granules according to any of embodiments 23-26, wherein the material of the outer layer is base ceramic material having the pigment and/or dopant dispersed therein.

Embodiment 28

The collection of colored solar-reflective roofing granules according to embodiment 26, wherein the base ceramic material is alumina, kaolin or bauxite.

Embodiment 29

The collection of colored solar-reflective roofing granules according to any of embodiments 1-28, wherein the outer layer is substantially transmissive to infrared radiation.

Embodiment 30

The collection of colored solar-reflective roofing granules according to any of embodiments 1-29, wherein in substantially each roofing granule the outer layer forms the outermost layer of the roofing granule.

Embodiment 31

The collection of colored solar-reflective roofing granules according to any of embodiments 1-29, wherein in substantially each roofing granule a substantially transmissive coating is formed on the outer layer.

Embodiment 32

The collection of colored solar-reflective roofing granules according to any of embodiments 1-29, wherein the roofing granules are substantially non-transmissive to ultraviolet radiation.

Embodiment 33

The collection of colored solar-reflective roofing granules according to any of embodiments 1-32, wherein at least 90% of the roofing granules of the collection have a particle size in the range of #5 US mesh to #50 US mesh.

Embodiment 34

The collection of colored solar-reflective roofing granules according to any of embodiments 1-33, wherein the collection of colored solar-reflective roofing granules has a solar reflectivity of at least 33%, e.g., at least 36%, or even at least 39°/o.

Embodiment 35

The collection of colored solar-reflective roofing granules according to any of embodiments 1-34, wherein the collection of colored solar-reflective roofing granules has a L* value of no more than 50, e.g., no more than 40 or no more than 30.

Embodiment 36

The collection of colored solar-reflective roofing granules according to any of embodiments 1-35, wherein at least 80% of the granules have a surface roughness Ra of no more than 300 nm.

Embodiment 37

A roofing product comprising a substrate; a bituminous material coated on the substrate, the bituminous material having a top surface; and the collection of solar-reflective roofing granules according to any of embodiments 1-36 disposed on the top surface of the bituminous material, thereby substantially coating the bituminous material in a region thereof.

Embodiment 38

The roofing product according to embodiment 37, in the form of a roofing shingle.

Embodiment 39

The roofing product according to embodiment 37, in the form of a roofing membrane.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A collection of colored solar-reflective roofing granules, wherein substantially each roofing granule comprises
an inner layer of a porous aluminum oxide-based ceramic material having a porosity in the range of 10-50%, the pore size and material of the inner layer being selected such that the inner layer is at least 80% reflective of infrared radiation; and
disposed about and substantially surrounding the inner layer, an outer layer of a substantially colored aluminum oxide-based ceramic material comprising at least one pigment and/or dopant, the outer layer of substantially colored ceramic material being at least 80% transmissive to infrared radiation, the outer layer having a porosity less than 1%,
the collection of colored solar-reflective roofing granules having a L* of no more than 50 and a solar reflectivity of at least 30%.

2. The collection of colored solar-reflective roofing granules according to claim 1, wherein in substantially each roofing granule the outer layer is disposed on an outer surface of the inner layer.

3. The collection of colored solar-reflective roofing granules according to claim 1, wherein in substantially each roofing granule of the collection the inner layer is formed as a granule core.

4. The collection of colored solar-reflective roofing granules according to claim 1, wherein in substantially each roofing granule of the collection the inner layer is formed as a layer surrounding a base particle.

5. The collection of colored solar-reflective roofing granules according to claim 1, wherein in substantially each roofing granule the porosity of the inner layer is at least 20%.

6. The collection of colored solar-reflective roofing granules according to claim 1, wherein in substantially each roofing granule the inner layer has a thickness of at least 25 microns and no more than 500 microns.

7. The collection of colored solar-reflective roofing granules according to claim 1, wherein in substantially each roofing granule the inner layer has a thickness of at least 250 microns and no more than 10 mm.

8. The collection of colored solar-reflective roofing granules according to claim 1, wherein the material of the inner layer is an aluminate, or aluminosilicate-based ceramic.

9. The collection of colored solar-reflective roofing granules according to claim 1, wherein the outer layer has a thickness of at least 100 nm and no more than 5 microns.

10. The collection of colored solar-reflective roofing granules according to claim 1, wherein in substantially each roofing granule the outer layer is a discrete layer from the inner layer, having a discrete boundary therebetween.

11. The collection of colored solar-reflective roofing granules according to claim 1, wherein the material of the outer layer is base ceramic material having the pigment and/or dopant dispersed therein.

12. The collection of colored solar-reflective roofing granules according to claim 1, wherein in substantially each roofing granule the outer layer forms the outermost layer of the roofing granule.

13. The collection of colored solar-reflective roofing granules according to claim 1, wherein in substantially each roofing granule a substantially transmissive coating is formed on the outer layer.

14. The collection of colored solar-reflective roofing granules according to claim 1, wherein at least 80% of the granules have a surface roughness Ra of no more than 300 nm.

15. The collection of colored solar-reflective roofing granules according to claim 1, wherein in substantially each roofing granule of the collection the inner layer is formed as a layer surrounding a base particle, the inner layer has a thickness of at least 25 microns and no more than 1 mm, and the outer layer has a thickness of at least 100 nm and no more than 5 microns.

16. The collection of colored solar-reflective roofing granules according to claim 1, wherein the aluminum oxide-based ceramic of the inner layer is based on alumina or alumina trihydrate.

17. The collection of colored solar-reflective roofing granules according to claim 1, wherein the aluminum oxide-based ceramic of the inner layer is based on kaolin or bauxite.

18. The collection of colored solar-reflective roofing granules according to claim 17, wherein the outer layer is based on alumina.

19. The collection of colored solar-reflective roofing granules according to claim 1, wherein the outer layer includes one or more of iron(III) and chromium(III) as dopants.

20. The collection of colored solar-reflective roofing granules according to claim 1, wherein the outer layer has a porosity less than 5%.

21. A roofing product comprising
a substrate;
a bituminous material coated on the substrate, the bituminous material having a top surface; and the collection of solar-reflective roofing granules according to claim 1 disposed on the top surface of the bituminous material, thereby substantially coating the bituminous material in a region thereof.

22. A collection of colored solar-reflective roofing granules, wherein substantially each roofing granule comprises an inner layer of a porous aluminum oxide-based ceramic material having a porosity in the range of 10-50%, the pore size and material of the inner layer being selected such that the inner layer is at least 80% reflective of infrared radiation; and disposed about and substantially surrounding the inner layer, an outer layer of a substantially colored aluminum oxide-based ceramic material comprising at least one pigment and/or dopant, the outer layer of substantially colored ceramic material being at least 80% transmissive to infrared radiation, wherein the outer layer is free of infrared-reflective pigments and dopants, the collection of colored solar-reflective roofing granules having a L* of no more than 50 and a solar reflectivity of at least 30%.

23. The collection of colored solar-reflective roofing granules according to claim 22, wherein in substantially each roofing granule the outer layer is disposed on an outer surface of the inner layer.

24. The collection of colored solar-reflective roofing granules according to claim 22, wherein in substantially each roofing granule the porosity of the inner layer is at least 20%.

25. The collection of colored solar-reflective roofing granules according to claim 22, wherein in substantially each roofing granule the inner layer has a thickness of at least 25 microns and no more than 500 microns.

26. The collection of colored solar-reflective roofing granules according to claim 22, wherein in substantially each roofing granule the inner layer has a thickness of at least 250 microns and no more than 10 mm.

27. The collection of colored solar-reflective roofing granules according to claim 22, wherein the outer layer has a thickness of at least 100 nm and no more than 5 microns.

28. The collection of colored solar-reflective roofing granules according to claim 22, wherein in substantially each roofing granule a substantially transmissive coating is formed on the outer layer.

29. A roofing product comprising a substrate;

a bituminous material coated on the substrate, the bituminous material having a top surface; and the collection of solar-reflective roofing granules according to claim 22 disposed on the top surface of the bituminous material, thereby substantially coating the bituminous material in a region thereof.

* * * * *